UNITED STATES PATENT OFFICE.

OTTO MANASSE, OF MUNICH, GERMANY, ASSIGNOR TO THE FARBWERKE, VORMALS MEISTER, LUCIUS & BRÜNING, OF HÖCHST, GERMANY.

OXYCAMPHOR AND PROCESS OF MAKING IT.

SPECIFICATION forming part of Letters Patent No. 610,361, dated September 6, 1898.

Application filed November 6, 1897. Serial No. 657,700. (No specimens.) Patented in Germany August 11, 1896, No. 91,718, and in England August 14, 1896, No. 18,035.

*To all whom it may concern:*

Be it known that I, OTTO MANASSE, doctor of philosophy, a citizen of the Empire of Germany, residing at Munich, Germany, have invented a new and useful Improvement in the Manufacture of Oxycamphor, (for which Letters Patent were granted to me in Germany, No. 91,718, dated August 11, 1896, and in England, No. 18,035, dated August 14, 1896,) of which the following is a specification.

If camphorquinone ($C_{10}H_{14}O_2$) be submitted to the action of reducing agents, a hitherto unknown compound is obtained of the combination $C_{10}H_{16}O_2$ and which is to be considered as oxycamphor of the constitution—

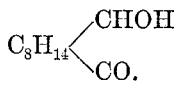

According to this constitution the compound is an alcohol, as well as a ketone. It furnishes, with benzoyl-chlorid a benzoyl compound, and with phenylhydrazin a phenylhydrazone. It can be retransformed into camphorquinone on oxidation with chromic acid.

Oxycamphor is employed in cases of dispnoe in doses of from one-half to one gram. I proceed with its manufacture, for instance, as follows: Camphorquinone is dissolved in acetic acid and zinc-dust added until disappearance of the yellow color of the solution, which is then treated with soda-lye till an alkaline reaction takes place and shaken out with ether. The ether being distilled off the oxycamphor remains as a white mass. The oxycamphor may be purified by crystallization from petroleum ether. Instead of zinc-dust other reducing agents, such as sodium amalgam aluminium, may be used and the reduction carried out with other solvents, such as alcohol and ether, for instance, instead of acetic acid.

Oxycamphor is a white crystalline compound, very easily soluble in alcohol, ether, benzene, less easily soluble in petroleum ether, and soluble with difficulty in water. It is volatile with steam vapor and melts at 203° to 205° centigrade. It possesses a peculiar odor and has a weak pepper-like taste.

I claim—

1. The process herein described of producing oxycamphor $C_{10}H_{16}O_2$ which consists in treating camphorquinone with acetic acid and zinc-dust, substantially as set forth.

2. As a new product, the compound called oxycamphor, derived from camphorquinone and reducing agents, being a white crystalline substance melting at 203° to 205° centigrade, being easily soluble in alcohol, ether and benzene, less easily soluble in petroleum ether and with difficulty soluble in water, volatile with steam vapor, and possessing a weak pepper-like taste, substantially as set forth.

In testimony that I claim the foregoing as my invention I have signed my name in presence of two subscribing witnesses.

OTTO MANASSE.

Witnesses:
EMIL WENZEL,
SAM BABBIT.